July 22, 1930. G. LANGFORD Re. 17,743

METHOD OF REPAIRING WORN RAIL JOINTS IN TRACKS

Original Filed Aug. 27, 1927

Inventor
George Langford
By Brown Boucher Dunne
Atty's.

Reissued July 22, 1930 Re. 17,743

UNITED STATES PATENT OFFICE

GEORGE LANGFORD, OF JOLIET, ILLINOIS, ASSIGNOR TO McKENNA PROCESS CO., OF JOLIET, ILLINOIS, A CORPORATION OF ILLINOIS

METHOD OF REPAIRING WORN RAIL JOINTS IN TRACKS

Original No. 1,670,515, dated May 22, 1928, Serial No. 215,985, filed August 27, 1927. Application for reissue filed May 12, 1930. Serial No. 451,770.

My invention relates to a method of treating or repairing worn rail joints to prolong their useful life.

The usual form of rail joints comprises two bars one on each side of the adjacent ends of the rail bolted together, which bars may or may not be angle bars. A rail joint loses its usefulness when the pounding of the train wheel over the rail causes the loss by abrasion or friction of metal on the surface of the bars where they come in contact with the rail, these surfaces being usually called fishing or bearing surfaces. This point of the rail joint is the first to give away and since the rails are not held firmly in a vertical direction it is necessary to replace the bars with new ones. As disclosed in my copending application Serial No. 686,140, I have described mending and repairing these bars with new ones. Rail joints may be repaired in this manner until the edges of the rail at the joints become battered and worn from the constant pounding of the wheels of a train passing over them. When this occurs, the joint can no longer be used and the present practice is to tear up the rail and transmit it to a point where the battered ends may be sawed off and be relaid at some other place. Each time this cold sawing takes place the length of the rail is shortened. In addition in order to repair worn rail joints of this character it is necessary to tear up the old rails and lay new ones. Not only is this undesirable but it involves a great deal of unnecessary labor and delay occasioned by the interrupted service.

Attempts have been made to avoid all this trouble by replacing battered ends or edges of the rail holding in joints by welding and by employing new bars. The difficulty with this method of treatment has been that when the edges of the rail become battered and worn in this manner it invariably follows that the fishing surfaces on the rail, that is the points where the bars are resting are very much worn. Thus the mere reconditioning of the edges of the rail at the joints and replacing with new bars is not sufficient, nor can it be used. In view of this fact the method of cold sawing formerly described is continued in vogue in spite of its obvious limitation as to expense, labor, and delay.

The principal object of my invention is to restore worn rail joints of this character in a highly satisfactory and efficient manner and without removing the rails or materially affecting train service over them. The tremendous importance of this step is obvious since it permits railroad service to be maintained at high efficiency at all times. This follows in view of the fact that the tracks or rails in need of repair are the ones that are used the most for passenger or freight hauling and it is important that these tracks be maintained in service at all costs. Since my invention obviates the necessity of taking up the tracks and permits the joints to be renewed immediately, it effects a tremendous saving.

Referring now to the drawings in which.

Figure 1:
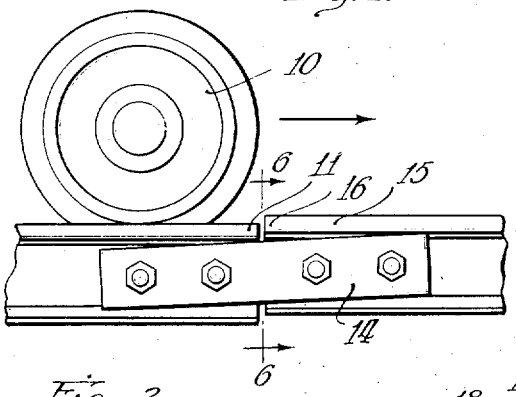
Figs. 1 and 2 are diagrams illustrating the action of a wheel passing over a joint.
Figure 2:
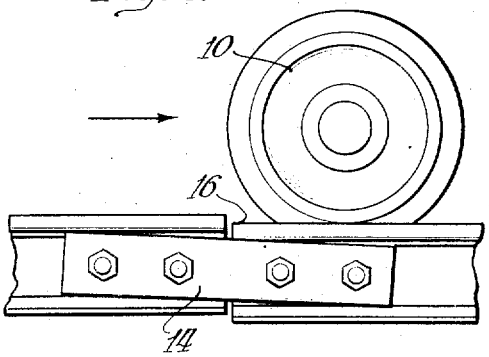
Figure 3:
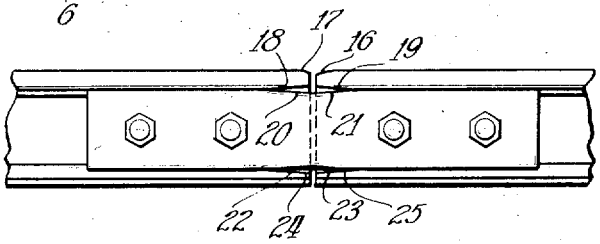
Fig. 3 is a view of the rail joint showing battered and worn surfaces of the adjacent edges of the rail and also the wearing on the fishing surfaces of the rail and bar.
Figure 5:
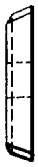
Fig. 5 is an end elevation of the same.
Figure 4:
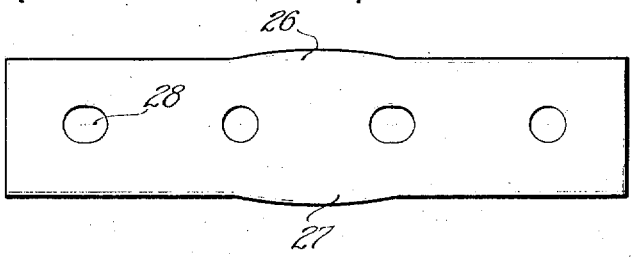
Fig. 4 is a side elevation of an improved bar which is formed from the worn bar in order to compensate for the wear.
Figure 6:
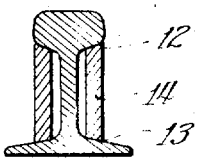
Fig. 6 is a cross section of a rail joint along the line 6—6 of Fig. 1 showing the fishing or bearing surfaces.
Figure 7:
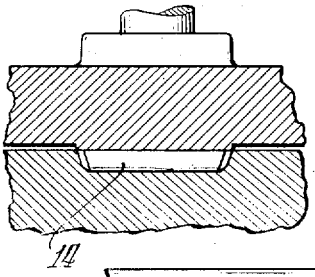
Fig. 7 is a cross section of the press employed for forming this bar.

The action of the wheels of the train in wearing the joints can be very readily seen in Figs. 1 and 2. The train wheel passing depresses the rail 11 just before it reaches the joints. This depression brings about wear in the bearing or fishing surfaces 12 and 13 where the rail is supported and strengthened vertically by the bar. Not only does this downward movement of the rail bring about a certain amount of wear in the fishing surfaces of the bar 14 but also of the bearing or fishing surfaces at the point where the bar contacts the rail. Since the rail 11 is lower than the rail 15 at the time of the passing of the wheel 10 from the rail 11 to the rail 15 a great deal of wear will occur at the point 16 or head of the rail. The lowering of the rail 15 and the rising of the rail 11 again brings about wear in the fishing surfaces of the bar and also of both rails. After being in service for a considerable length of time the joints become worn on either side of the rail as may be seen from Fig. 3. There are five points of wear. One of these points is at the surfaces at the heads of the rail forming the joint, such as 16 and 17; the bearing surfaces on the head portion of the rail namely 18 and 19; the third, the bearing portions of the bar that supports the rail, namely 20 and 21; the bearing portions of the bar that is supported by the flanged portions of the rail; namely 22 and 23 and fifthly and lastly, the bearing or fishing surfaces adjacent the flange portion of the rail, namely 24 and 25.

My method of repairing rail joints comprises taking the old and worn bars, heating them an amount sufficient so that they may be easily worked, though not sufficiently to destroy their temper, putting them in a press and subjecting them to pressure so that crown surfaces 26 and 27 are formed at the upper and lower surfaces or edges of the bar at the points constituting the fishing or bearing surfaces. The press has bosses or projections that are adapted to fit within the holes such as 28 of the bar so as to prevent these holes becoming distorted under pressure. This method of treating worn bars has been fully described in my application Serial No. 686,140. I have disclosed in detail the method of forming these crowned bars from the worn bars.

It will be seen that the edges of this crown bar form a dihedral angle so as to support the head of the rail.

It will be understood that the showing of the action of the wheel in passing over a joint and in bringing about the wearing thereof are considerably exaggerated to show the tendencies involved. Even though the joint is new and very tight the same tendencies are involved. This is true because it is well known to those who are familiar with the subject that the passing of a wheel over the rail causes it to flex and modern road beds are designed to permit and encourage this flexing. The load of the wheel is a concentrated load and as it shifts along it tends to move the point of depression along the rail so that the rail actually moves downward and upward as the load passes on to and off of it, the result being that when the rail passes over a joint even if the joint is absolutely tight, so far as drawing up the bolts is concerned and so far as the contact between the fishing surfaces is concerned the bending of the bar to even a slight degree results in a rubbing action between the surfaces 18 and 20, 19 and 21, 22 and 24, and 23 and 25, with the result that continuous rubbing wears away the metal to the point where actual play occurs and then the pounding action which follows the existence of the play accentuates the play and the joints rapidly deteriorate. In addition this flexing and pounding bring about the wear at the head of the rail on the surfaces 16 and 17.

The expansion and contraction due to changes in temperature is another contributing factor to wear though this is not necessarily concentrated at the central point of the bar as is the action of the wheel.

It will thus be seen that by replacing the worn bar with the crown bar and forcing it into place that the worn fishing surfaces are filled in and to all intent and purposes the joint is as good as new. The crowned portion of the bar not only repairs the fishing surfaces of the bar but also the fishing surfaces of the rail. The angle at the edge of the reformed bar varies from the central part of the bar toward the edges for the purpose of securing a uniform set between the bar and the rail. It will thus be seen that this replacement removes all points of wear in the joints leaving only the head portions 16 and 17 of the rail at the joints. However, unless this head portion of the rail is repaired the joint is useless after a certain amount of wear occurs and the track is torn up and the worn end of the rail sawed off and relaid at some other point. As pointed out before, this is a very expensive operation not only from the standpoint of direct cost but also from the standpoint of delay and confusion in transportation facilities. This follows, when it is considered, that the joints on the tracks that secure the most wear are those in constant use, which are the main tracks. Consequently, it becomes highly important to provide some means for reforming the battered head of the rail.

Figure 8:
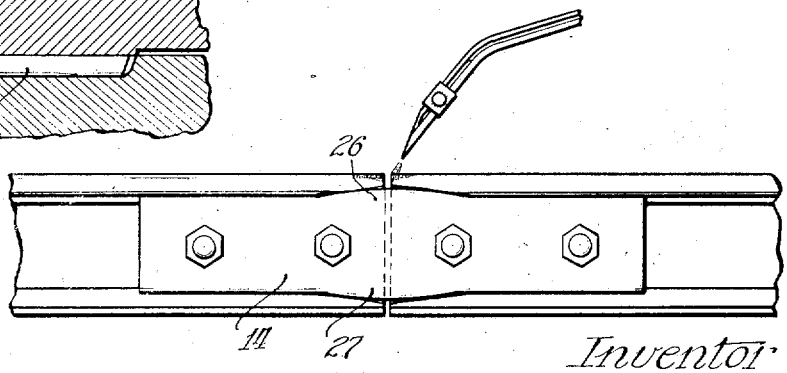
Fig. 8 shows the method of carrying out my improved process.

I accomplish this result by welding new metal to the worn and battered ends 16 and 17 of the rail in any well known or approved manner so that the rail head takes the form shown in Fig. 8 with the head of the rail substantially the same in configuration as before.

It will be appreciated that it is essential that the crown bar be employed in reforming the rail joint as it is impossible to properly weld the fishing surfaces of the rail and bar and certainly not without tearing up the tracks; and when this is done cold sawing might as well be resorted to.

It will be apparent from the foregoing that my method of reforming worn rail joints briefly consists in reforming the worn bars into crown bars by which the fishing surfaces of both the bar and the rail are repaired and then by welding metal to the heads of the rails so as to bring them to their original conditions. In this manner the joint is completely reformed and all the worn surfaces are eliminated.

In practice it will probably be desirable to form the crown bar at a central point in the railroad yard and distribute them to the crews that do the actual repair work. In this instance the method will consist in taking the old bars from the joints and replacing them with crowned bars and then proceeding with the welding process. It will be appreciated that this method of repairing worn rail joints is an exceedingly cheap one, saving not only a tremendous amount of money over the old cold sawing method where the track had to be torn up but rendering it unnecessary to bypass traffic for a considerable length of time causing confusion and delay in traffic schedules.

It will be appreciated that unless a crown bar is employed in repairing the joints a proper renewal cannot be made. For instance if an attempt were made to renew the joints by simply placing a new bar on either side of the rail and bolting them together, while the fishing or bearing surfaces on the bar would be repaired there would still remain the bearing surfaces on the rail both on the end portion and the flange portion. Consequently a crowned bar must be used in order to repair four of the five points of wear.

It is an essential feature of my invention, that the bar be of suitable shape and height to fit the worn fishing surfaces of the rail ends. This I accomplish by increasing the height of the bar to a suitable extent and properly shaping it for effecting the desired fit when applied to worn rail. The increase in height of the bar is what I term crowning the bar. This crowning is preferably applied at the center portion of the bar, as in the specific form of my invention illustrated by way of example, or it may be applied to the bar in any other suitable manner. My invention contemplates the use of rail joint bars of suitable height and shape to fit worn rail ends, whether such bars be of the specific shape illustrated or of other suitable shape, as will be clear from the preceding description. The method of my invention comprehends, therefore, the fitting to worn rail of bars of suitable height to properly fit into the worn fishing surfaces of the rail ends, and the restoration of the rail heads.

It will be appreciated that while I have described my method as employing straight bars if desired angle bars may be treated in the same manner as explained in my Patent 1,562,423 issued November 17, 1925.

While I have shown and described a specific embodiment of my invention, it will be understood that I do not desire to be limited to certain embodiments but wish to protect by Letters Patent all such changes, modifications, and deviations as come within the scope of the appended claims.

I claim:

1. The process of renewing a worn rail joint which comprises in combination, forming the worn bars into crowned bars, placing them back upon the rails with new bolts, and welding new metal to the head of each rail to form them to their original shape.

2. The process of renewing a worn rail joint which comprises removing the worn bars from the joints, forming them into crowned bars, placing them back upon the rails, and welding new metal to the head of each rail.

3. The process of renewing a worn rail joint which comprises removing the worn bars from the joint, replacing them with crowned bars, and reforming the heads of adjacent rails by welding.

4. The process of renewing a worn rail joint for the purpose for which it was originally employed which consists in removing the angle bars and heating, then redistributing their metal by pressure so that the dimensions of contact surfaces and draw space and size and spacing of bolt holes are the same as those of the original new bars, replacing them upon the rails with new bolts, fastening them together to form a joint and welding the heads of the rails to reform them to their original shape.

5. The process of renewing a worn rail joint which consists of removing the worn bars from the joint, replacing them with crowned bars, and adding metal to the heads of the adjacent rails to reform them to their original shape.

6. The process of renewing a worn rail joint for the purpose for which it was originally employed which consists in removing the angle bars and heating, then redistributing their metal by pressure so that the dimensions of contact surfaces and draw space and size and spacing of bolt holes are the same as those of the original new bars, replacing them upon the rails with new bolts, fastening them together to form a joint and adding metal to the heads of the adjacent rails to reform them to their original shape.

7. The process of renewing a worn rail joint which consists in removing the worn bars from the joint, replacing them with crowned bars, fastening the bars in place with new bolts and permanently adding metal to battered heads of the rails to bring them to their original shape.

8. The process of renewing a worn rail joint, which consists in removing the worn bars from the joint, replacing the worn bars by bars of a height and shape when out of the joint to fit the worn fishing surfaces of the rail ends, and restoring the heads of the rail ends while in the track.

9. The process of renewing a worn rail joint which consists in removing the worn bars from the joint, replacing the worn bars by bars of greater height than the original bars and shaped when out of the joint to fit the worn fishing surfaces of the rail ends, and restoring the heads of the rail ends while in track.

10. The process of renewing a worn rail joint, which consists in removing the worn bars from the joint, replacing the worn bars by bars having at least their center portions of greater height than the original bars and shaped when out of the joint to fit the worn fishing surfaces of the rail ends, and restoring the heads of the rail ends while in track.

In witness whereof, I hereunto subscribe my name this 3d day of May, 1930.

GEORGE LANGFORD.